F. BOYLSTON.

Children's Carriage.

No. 3,224. Reissued Dec. 8, 1868.

Witnesses.

H. C. Ashkettler

Wm A. Morgan.

Inventor.

F. Boylston per Munn & Co attorneys

N. PETERS, Photo-Lithographer, Washington, D. C.

United States Patent Office.

FRANCIS BOYLSTON, OF NEW YORK, N. Y.

*Letters Patent No.* 82,683, *dated October* 6, 1868; *reissue No.* 3,224, *dated December* 8, 1868.

IMPROVEMENT IN CHILDREN'S CARRIAGES.

The Schedule referred to in these Letters Patent and making part of the same.

*To all whom it may concern:*

Be it known that I, FRANCIS BOYLSTON, of New York, in the county of New York, and State of New York, have invented a new and useful Improvement in Children's Carriages; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

Figure 1:
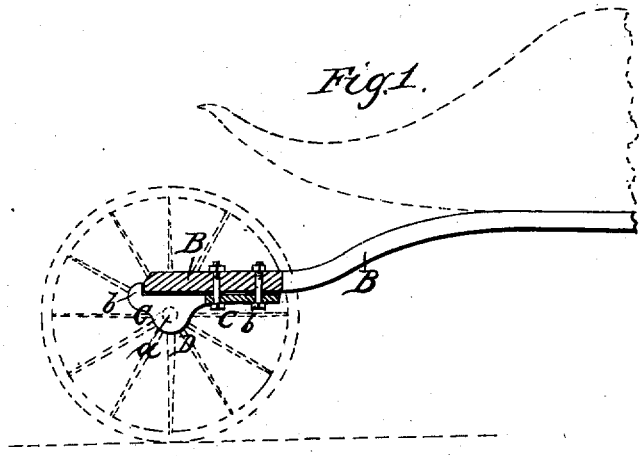
Figure 1 represents a side elevation, partly in section, of my invention.
Figure 2:
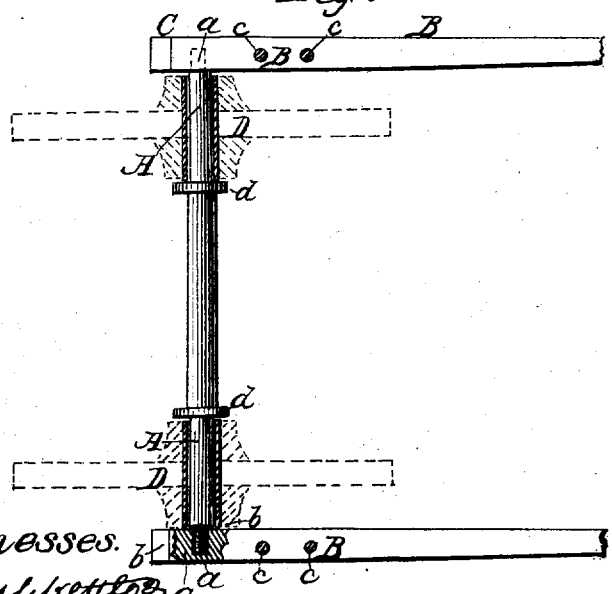
Figure 2 is a plane or top view, partly in section, of the same.

This invention relates to a new manner of arranging the front wheels on the front axle, and of attaching the front axle to its supports on the forward part of that class of children's carriages which are known under the denomination of "perambulators."

A, in the drawing, represents the front axle of a children's carriage.

*a a* are male screws, formed on the ends of the axle A.

C C are brackets, through which are sockets, having a female thread therein, so that they can be screwed upon the respective ends of the axle.

*b b* are arms to the brackets C C, which are secured to the under part of the ends of the sills or front axle-supports B B by means of bolts or screws, *c c*.

D D are front wheels.

The axle A is fixed by being screwed into the brackets C C, by either right-hand or left-hand screws, on both ends of the axle, and therefore the axle does not turn in the sockets of the brackets C C.

The hubs of the wheels D D are loose upon the axle A, and are kept in position by the brackets C on the outside, and by the collars, *d*, on the axle A on the inside end of the hubs. Therefore each wheel is allowed to rotate, independently of the other, upon a fixed axle, A, and inside of the supporting-sills B B and brackets C C.

The front axle, A, may be secured to the brackets C and sills or supports B by other means than the screws hereinbefore described, as by passing the ends of the axle through the brackets C, and securing it in position by screw-nuts outside the brackets, or by passing a key, through bracket, into the ends of the axle; or other similar means to secure the axle may be used.

A children's carriage or perambulator having the front wheels attached in accordance with my improved method will operate, when turning, or deviating, when in motion, from a straight line, upon them, much easier and better than would be the case were the two front wheels fixed upon a revolving axle.

Having thus described my invention,

What I claim as new, and desire to secure by Letters Patent, is—

1. The combination and arrangement of the fixed axle A, having two revolving wheels thereon, and sills or supports B B, when the same are attached to the front part of a children's carriage or perambulator, substantially in the manner herein shown and set forth.

2. Attaching the fixed axle A to the supports B B by means of the brackets C C, and secured by the screws *a a*, or their equivalents, the whole of the parts being made and combined with a children's carriage or perambulator, substantially in the manner herein shown and described.

3. The combination and arrangement of the fixed axle A, having thereon two loose wheels, D D, brackets C C, and sills or supports B B, the whole being made and combined, with relation to each other, and to a children's carriage or perambulator, substantially as and in the manner herein shown and set forth.

FRANCIS BOYLSTON.

Witnesses:

GEO. T. PALMER,
R. H. BOYLSTON.